United States Patent [19]

Bohm

[11] Patent Number: 4,559,117
[45] Date of Patent: Dec. 17, 1985

[54] BLOCK COPOLYMERS MADE BY RADIATION CROSSLINKING OF MISCIBLE MIXTURE OF HOMOPOLYMERS

[75] Inventor: Georg G. A. Bohm, Akron, Ohio

[73] Assignee: The Firestone Tire & Rubber Company, Akron, Ohio

[21] Appl. No.: 441,202

[22] Filed: Nov. 12, 1982

[51] Int. Cl.[4] .............................. C08J 3/24; C08J 3/28; C08L 9/00; C08L 53/00
[52] U.S. Cl. .......................... 204/159.13; 204/159.17; 204/159.18; 204/159.2; 204/159.14
[58] Field of Search ............ 204/159.2, 159.13, 159.14, 204/159.17, 159.18

[56] References Cited

U.S. PATENT DOCUMENTS

| | | | |
|---|---|---|---|
| 2,924,559 | 2/1960 | Safford et al. | 204/159.2 |
| 3,855,379 | 12/1974 | Araki et al. | 204/159.2 |
| 4,102,761 | 7/1978 | Bohm et al. | 204/159.2 |
| 4,220,512 | 9/1980 | Bohm et al. | 204/159.2 |

FOREIGN PATENT DOCUMENTS 564824 8/1958 Belgium .......................... 204/159.2

Primary Examiner—Allan M. Lieberman
Attorney, Agent, or Firm—Daniel N. Hall

[57] ABSTRACT

The process described herein comprises the crosslinking by radiation of a miscible mixture of two or more homopolymers such as A and B, etc., to give a block copolymer having one or more blocks of A and one or more blocks of B. This process has the advantage of effecting crosslinking between blocks at such a rapid rate that substantial crosslinking is effected before phase separation occurs. Moreover, the process may be modified by agents which promote crosslinking and also by compatibilizing agents to give improved miscibility of the A and B homopolymers. Other modifications of the process effect improvements either by centrifugal separation of gelled high molecular weight products or by breaking down the molecular weights of such gelled portion either by mechanical shear or by ultrasonic treatment. The product of this invention has a variety of uses such as in adhesive and coating compositions, molding compositions, compatibilizing agents, etc.

16 Claims, 3 Drawing Figures

BLOCK COPOLYMERS MADE BY RADIATION CROSSLINKING OF MISCIBLE MIXTURE OF HOMOPOLYMERS

BACKGROUND OF THE INVENTION

1. Field of the Invention

This invention relates to the production of block copolymers prepared by rapid crosslinking of miscible mixtures of two or more homopolymers. More specifically it relates to the production of block copolymers, such as blocks of high-vinyl-polybutadiene and of low-vinyl-polybutadiene, by the irradiation of a miscible mixture of two or more homopolymers. Still more specifically, it relates to the production of such block copolymers while maintaining the copolymers below or slightly above the gellation state.

2. Related Prior Art

When a mixture of two or more different homopolymers of type A, B, etc. is crosslinked or coupled, two possibilities arise. If the homopolymers are immiscible, crosslinking will take place independently in the phase-separated regions composed of homopolymer molecules A and in the regions composed of homopolymer molecules B, etc. That is, mostly A-A and B-B crosslinks will be formed because homopolymer molecules A will almost exclusively be surrounded by homopolymer A molecules and, conversely, homopolymer B molecules will be predominantly surrounded by B molecules. There will be a few A molecules in contact with B molecules along the interface of the domains of this heterogeneous blend. This should lead to some A-B or copolymer links, but the volume contribution of such links should be extremely small considering the small number of molecules located in the interface regions. The result of such crosslinking will therefore be a heterogeneous mixture of higher molecular weight homopolymers with eventual gelation of one or the other or both polymers occurring when the number of crosslinks introduced exceeds the critical crosslink density required for gelation.

As used herein the term "miscible" means that the components of a blend or mixture are completely compatible or homogeneous at the temperature being used. Miscibility of two or more polymers depends on a number of factors including similarity of structural units in the respective polymers, molecular weights of the polymers, temperature of the mixture, proportions of the respective components, etc. For example, two particular polymers may be compatible at a particular molecular weight range and incompatible or immiscible at higher molecular weights. Moreover, two particular polymers may be immiscible at room temperature but may become miscible at higher temperatures.

If the polymer components are totally miscible, homopolymer molecules A will find themselves surrounded by both molecules A and molecules of polymer B, etc. Then, provided that the structure of the two types of molecules permit crosslinking by one mechanism or another, crosslinking or coupling should become possible not only between AA and BB molecules, but also between A and B molecules. If the crosslinking is continued, it will be likely that molecules which have already undergone one crosslinking step will continue to crosslink. For example, a molecule which has been formed by the crosslinking of an A and a B molecule (now referred to as AB molecule) may undergo further crosslinking with either an A molecule or a B molecule or an AA molecule or a BB molecule or another AB molecule forming ABA, ABB, ABAA, ABBB or ABAB structures, respectively. The resulting molecule now composed of three or four original units can undergo further crosslinking resulting in longer and even more complicated structures. The sequence of events described for the case of a miscible blend of molecules A and B could very easily be extended to miscible blends made up of molecules of types A, B, C. etc.

Depending on the structure of the homopolymers, it may be that while A and B molecules of a certain molecular weight are miscible, similar polymer molecules of a higher molecular weight such as are formed by AA and BB linking are not miscible anymore. The incorporation of B molecules in A molecules such as is accomplished through an A-B link will tend to make AA and BB molecules more compatible, but even then a point may come where partial or complete phase separation will occur. This phase separation will require a certain period of time governed by the molecular weight of the polymers involved, the temperature, the presence of diluents, etc. Because molecules in such a system contain segments of homopolymer structure A and B linked together, such polymers are called block copolymers. These materials are useful as compatibilizing agents but they also can find utility as product by themselves as adhesives, coatings, etc.

In the course of making these copolymers, problems may be encountered because a gelation of the miscible blend may be induced on prolonged crosslinking. The utility of a gelled material as a compatibilizing agent, etc. would be very limited. At the gel point, few, very long molecules, because of the greater number per molecule of crosslinking sites, will start to form a network while a large fraction of the low molecular weight molecules of types A and B have undergone little, if any, crosslinking. In the terminology of polymer science, that means that the weight average molecular weight is approaching infinity at the gel point while the number average molecular weight of the mixture has increased only slightly. The reason for this phenomenon is that the probability for a molecule to crosslink with another molecule depends on its molecular weight - the higher the molecular weight, the greater the number of crosslinking sites and the greater the probability for crosslinking. The further increase in molecular weight through crosslinking of long chain molecules is thus more favorable in contrast to the less favorable growth and crosslinking of the shorter chain building blocks A and B. As it is the object to link as many A and B molecules as possible to form the polymer of the desired structure, it is obvious that an early gelation of the mixture is undesirable since, as stated before, many of the homopolymer molecules A and B have at that point not yet been linked together in any form. It is obviously undesirable therefore that gelation of any portion of the mixture should occur prior to crosslinking or coupling of substantially all of the A and B homopolymer molecules. In other words, there is a greater tendency for the larger polymer molecules to grow to the gelation stage than there is for the low molecular weight homopolymers A and B to join together.

SUMMARY OF THE INVENTION

In accordance with the present invention, it has been found that when the crosslinking in accomplished at a very rapid rate, such as is possible by radiation crosslinking of a miscible mixture of two or more polymers containing at least 20%, preferably at least 40% by weight of each of two polymer components, phase separation is not introduced, presumably because the crosslinking occurs at a rate much faster than that necessary for a polymeric composition to phase separate as dictated by thermodynamics. This provides an effective means for producing copolymeric systems composed of segment structures A and B, etc. The crosslinking is effected in the practice of this invention by subjecting the mixture to be crosslinked to an adequate dose of high energy radiation. Typically useful high energy sources of radiation include gamma rays, x-rays, beta rays and accelerated electrons, protons and alpha particles. Electrons accelerated through 300,000 volts or more, gamma rays and x-rays are generally the most practical energy sources.

The radiation is carried out by subjecting the composition to a beam of high energy electrons under conditions that will give the desired total dose. Typically, the dose rate is from about 0.02 to 5 megarads per second, although appreciable variation is possible. With electrons of 1.5 MeV or higher energy, sheets of the mixture up to about 0.25 inches can be effectively irradiated from one side alone. With thicker sheets, for example up to 0.5 inches, optimum results are normally achieved by two passes through an electron beam, first on one side and then on the other, or by the use of sources on both sides. However, linear accelerators are now available which will penetrate 0.75 inch or more and these may be used to avoid the use of two passes. Compositions in shapes other than sheets can be cured by procedures which are well known to those skilled in the art.

Conventional radiation equipment and techniques can be employed in the practice of this invention. For example, the desired amount of irradiation can be obtained by using a 300 keV electron accelerator which emits a circular beam of electrons from a heated cathode filament. The electrons are guided through a scanning magnet and emerge through a thin titanium window which is approximately 1 by 24 inches. A beam of power of 3 kw is obtained at an operating current of 10 mamps. The dose delivered can be measured using the well-known blue cellophane technique, Henely and Richman; Anal. Chem. 28, 1580 (1950). By altering the beam current, beam diameter and distance to the source, various dose rates of radiation can be obtained.

It also has been found possible to delay or postpone the conversion of the high molecular weight portions of such crosslinked products to gelation until substantially all of the low molecular weight homopolymer molecules A and B have been joined together. This avoidance of undesirable gelation is effected by various methods.

One technique involves the separation of the larger molecules as they are being formed by the crosslinking process such as by centrifugation. By this procedure, one can efficiently make block copolymers of the desired structure and as the higher molecular weight copolymers are formed, they are taken out of the system prior to the point where they might gel.

In accordance with this centrifuging technique, the central portion of the centrifuging equipment is designed so that the radiation may be transmitted to the central portion of the liquid in the centrifuge while the higher molecular weight or more highly crosslinked portion is thrown by centrifugal force to the outer region of the centrifuge. This results in an effective removal of the crosslinked material while the uncrosslinked material is concentrated in a central area which is exposed to radiation.

Another approach is to selectively break down the higher molecular weight polymers. This can be accomplished by several techniques in which the rate of breakdown is proportional to $M_w^x$ where x is equal to or greater than 1. One method involves the exposure of such a mixture to ultrasonic waves; another involves exposing the mixture to a mechanical shear field. In both cases, higher molecular weight molecules are selectively broken down. In these latter methods, no polymer is removed during the preparation of the block copolymer, but the simultaneous or sequential irradiation of the mixture and the degradation of the high molecular weight portion of that mixture avoids a gelation of the material and promotes a continuous production of block copolymer structures of the above-described type. This degradation may be effected by shearing forces as applied by a kneading machine, by milling or by ultrasonic vibration.

To aid in the description of the present invention, reference is made to the accompanying drawings in which.

Figure 1:
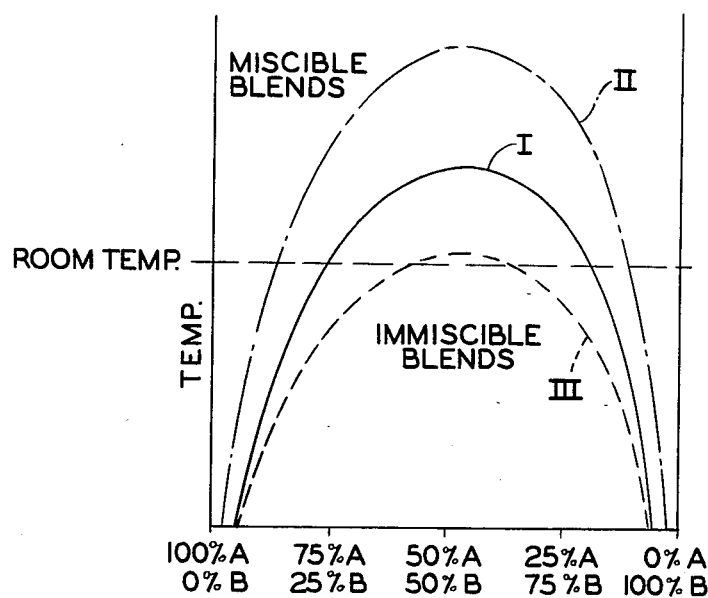
FIG. 1 shows a series of curves which are typical cloud point curves showing miscible and immiscible ranges for several typical mixtures of polymers.

The curves shown in FIG. 1 are determined by taking different proportions of one polymer (A) and of a second polymer (B), heating the mixture until the blend has become completely miscible and the resultant solution has become clear. Then the mixture is allowed to cool and the temperature at which the solution starts to become cloudy is noted. These clouding temperatures for the respective proportions of a particular combination are plotted as cloud point curves I, II and III. The respective polymers A of the different curves may be different types of polymers or may be similar polymers with different molecular weights. Likewise the respective polymers B of the various curves may be different types of polymers or may be similar polymers with different molecular weights.

With each individual curve the area within the curve represents immiscible mixtures and the area outside the curve represents miscible blends. For the purpose of this invention, a particular mixture is maintained at a temperature above its cloud point curve so as to give a miscible blend.

Figure 2:
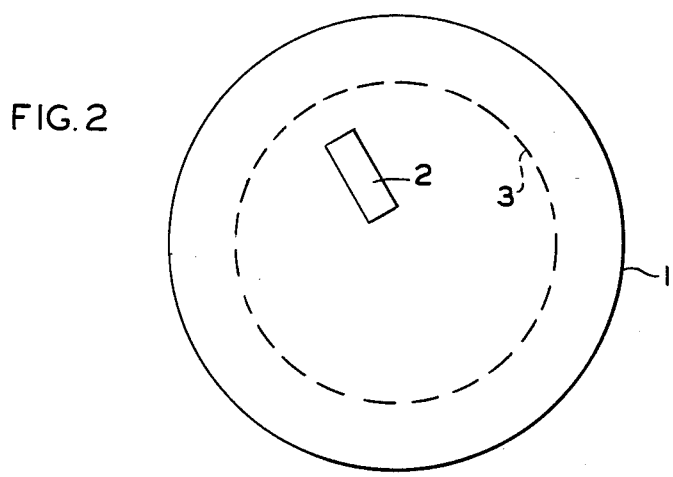
FIG. 2 is a top plan view of centrifuge equipment used in the practice of this invention.

FIG. 2 shows a top plan view of centrifuge 1 with electron beam unit 2 positioned over a central portion of the centrifuge. The portion of the centrifuge within the area encircled by dotted line 3 should be made of a material such as aluminum which will not interfere with the transmission of radiation into the blend contained within that area of the centrifuge. As the centrifuge is operated, the centrifugal force will drive the highly crosslinked or higher molecular weight material to the outer fringe of the centrifuging area, that is between line 3 and the periphery of the centrifuge. This latter area is outside the area represented by the circle of line 3 and therefore is not treated with radiation. With the highly crosslinked material being concentrated in the area outside the circle of line 3, the uncrosslinked or less crosslinked material will be concentrated within the circle of line 3 and therefore is subjected to radiation as the material is circulated under electron beam element 2.

Figure 3:
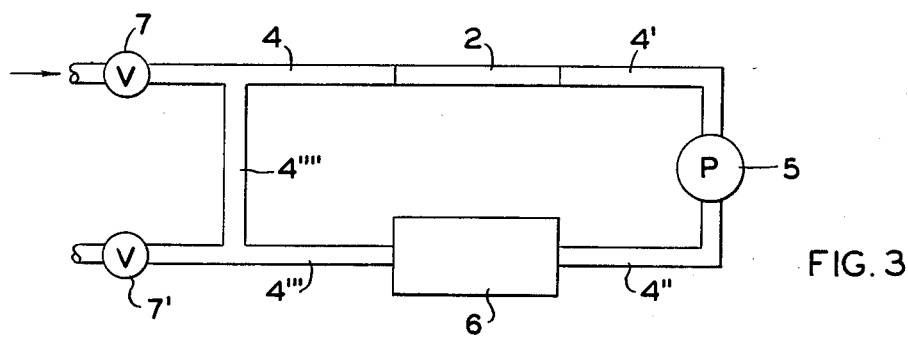
FIG. 3 is a schematic representation of recycling equipment used for irradiation in one portion and degradation or breaking down of highly crosslinked material in another portion of the equipment.

FIG. 3 shows a schematic view of equipment in which a miscible blend is fed into passageway 4 through an area where electron beam unit 2 can transmit radiation into the blend, after which pump 5 draws the radiated mixture into line 4' and then drives it into line 4" and into degrading unit 6 where either shear mechanical force or ultrasonic force is used to degrade the highly crosslinked portion to less highly crosslinked material which is then passed through lines 4''', 4'''' and 4 to the area of electron beam unit 2 for repetition of the radiation treatment. While this cycling is being effected, valves 7 and 7' are closed for as many repetitions of the radiation and degradation as is desired to give more uniform crosslinking of the complete mixture without an undesirable amount of too highly crosslinked material while still in a soluble state or only slightly gelled state.

Before giving further details on the methods and on the utility of polymers made by this technique, reference should be made to two tools which can help speed up the crosslinking reaction and permit a selective crosslinking to be achieved. The first tool involves the use of direct or indirect crosslinking promoters. The indirect crosslink promoters do not get incorporated in the polymer, but they accelerate the formation of crosslinks in this miscible system. The direct crosslink promoters such as the poly-functional mercaptan compounds (1,10-dimercaptodecane, etc.) actually become the link between the polymer units which are crosslinked by the radiation process. These additives may also prove advantageous in promoting the solubilization of the two low molecular weight homopolymers. The degree to which they can solubilize these polymers will depend on their structure and the difference in the structure of the A and the B molecules.

The second tool concerns itself with achieving a preferential crosslinking of the two polymers. The rate and type of crosslinking of the two polymers will depend on the nature, concentration and distribution in the two homopolymers A and B of the groups which participate in the formation of the link. Certain groups will favor the crosslinking between like units but will make it difficult or impossible to link unlike units. In this case, crosslinking between AA units and BB units will become possible but linkage between A and B molecules will be difficult even though the two molecules will be in close proximity to each other. Conversely, one might be able to select functional groups which suppress AA and BB linkages but favor AB linkages. Those skilled in the art will be able to select the type of functional groups for the preparation of the low molecular weight polymers A and B that will facilitate the preparation of block copolymers of the type desired. Finally, it may be worth pointing out that when these functional groups through which crosslinking will occur are incorporated at random in the A and B polymers, the links formed in the AA, BB and AB molecules will also be introduced in a random fashion, that is, that links will be formed toward the end of a molecule, some more in the middle, etc. If, on the other hand, one wishes to form the linkages preferentially at the ends of the molecules, it may be advisable to incorporate these functional groups primarily at the ends of the molecules in which the crosslinking will produce more linear types of products.

While reference is made herein to homopolymers being joined to form block copolymers, it is also contemplated that one or two random copolymers such as a styrene-butadiene copolymer, may be used as one or two of the components for crosslinking to block copolymers. It is more appropriate therefore to refer to the blend components more generically as "polymers".

The block copolymer products of this invention can be used for various purposes such as in adhesive systems, in coatings, in molding compositions and in a range of applications. For example, it may be desirable to prepare a material which has good surface tack as well as cure compatibilty with SBR polymers. Thus one may wish to assembly by the above-described technique a block copolymer made up of an A unit having a structure which imparts good tack and a B unit composed of Bd/S. The product made by the radiation crosslinking of these two miscible prepolymers then has the desired properties.

The copolymers of this invention are also useful as compatibilizing agents. When two immiscible polymers are blended, rather unique properties can be potentially achieved in such a blend. These are now commonly used for the manufacture of tires, thermoplastic elastomers and other uses. In order to benefit from the combination of different materials, it is necessary to assure that good physical bonding exists between the separate domains present in such a heterogeneous blend. If the two polymers are similar in structure, good bonding is often achieved. However, the optimum synergism in performance is often not realizable with blends of rather dissimilar polymers. In this case, it has been found useful to add to a blend of A and B molecules an AB block copolymer in which the A and B segments are more or less identical to those of the A and B polymers. When that is the case, an improvement in the physical bonding between the separate domains is accomplished and with it an improvement in the physical properties of the blend are observed. Recent studies infer that this improvement is achieved because the block copolymer molecules locate themselves preferentially at the interface between the domains. The A part of the block copolymer molecule penetrates the domain composed of A molecules whereas the B part diffuses into the domain composed of B molecules and in so doing, bridges the interface which, in turn, will enhance the bonding. Block copolymers can often be made by different synthesis methods. However, as is sometimes the case, the A portion of the block copolymer can only be made by one form of synthesis such as anionic polymerization while the B part of the molecule can only be made by a different method such as radical polymerization. In these cases, it is difficult or impossible to link these two building blocks together in ways other than by the method described herein.

As indicated above, irradiation or higher energy radiation is used in the practice of this invention. While various types of irradiation are suitable for this purpose such as X-ray and gamma and beta rays, the radiation produced by high power electron accelerators has been found to be very conveniently and economically applicable and to give very satisfactory results. Since it is generally the purpose of this invention to put in as much energy as possible in a short time in order to get fast crosslinking, this dictates a preference of electron accelerators over other types of radiation. However, regardless of the type of irradiation and the type of equipment used for its generation or application, the use thereof in the treatment of polymers as described is contemplated as falling within the scope of this invention so long as it is produced by or from electron energy of at least about 10,000 electron volts. While there is no upper limit to the electron energy that can be applied advantageously, the effects desired in the practice of this invention can be accomplished without having to go above 50,000,000 electron volts. Generally the higher the electron energy used the greater is the depth of penetration into massive structures of polymer.

Two basic types of radiation sources are generally utilized in industrial processes. These are radioisotopes such as $^{60}$Co which emits gamma rays of 1.17 and 1.33 MeV energies and electron accelerators with energies in the 0.1–10 MeV range. The type of source to be used depends largely on the size and shape of the product and the production throughput required. Gamma radiation, which has much greater penetrating range than electrons of similar energy, is useful for the exposure of thick, bulky or oddly shaped products, but its use suffers in comparison to that of electron radiation because of its radiation intensity which results in a limited product throughput rate. Gamma sources have primarily been used commercially for the preservation of food, sterilization of medical devices, crosslinking of polymer impregnated wood and the treatment of sewage sludge.

Several types of electron accelerators are available for industrial use and each possesses characteristics which make it useful for the irradiation of certain types of products. At the low end of the energy range are the Electrocurtain and Electrocure Processors which are made to perform between 150 to 300 keV at beam currents of up to 125 mA. The low energy restricts their usage to the irradiation of very thin sheets or coatings and paints.

Van de Graaff accelerators range in energy from 0.4 to 3 MeV but produce low beam currents of 1 mA or less. These machines can also be built to accelerate protons, deuterons, helium ions as well as heavy ions at current beams up to 50 A. Van de Graaff accelerators are very useful for research work but because of their very low beam currents, find little industrial application, with the possible exception of ion implantation.

Linear accelerators (Linacs) are supplied by several companies and operate at energies as high as 20 MEV with a pulsed rather than continuous electron or ion beam. The high energy capability makes Linacs very useful for irradiation of thick or odd-shaped products. The chief limitation of these accelerators is a maximum power of 25 kilowatts, which severely restricts product throughput at high energies. Shielding against the high energy Bremsstrahlung produced with these accelerators can also be a difficult problem for industrial use.

Two types of electron accelerators which have a good balance of energy (0.3 to 4 MeV) and beam current (up to 100 mA) for industrial radiation processing of relatively thick products are the Dynamitron and the Insulated Core Transformer Electron Processing System (ICT). These differ in the manner in which the high voltage is generated and transmitted to the electron accelerating tube but they offer similar coverage of power ranges and reliability of performance. A detailed discussion of the operational principles of these and other electron accelerators is given by R. E. Schuler in Int. J. Radiation Phys. Chem. 14, 171 (1979).

Typical polymers that may be used in miscible blends for irradiation in accordance with the practice of this invention include but are not limited to: polyethylene, polypropylene, polybutylene, polybutadiene, polyisoprene, polyacrylonitrile, polyacrylates, polyvinylacetate, polyvinylchloride, polyvinylidenechloride, ethylene-propylene copolymers, butadiene-styrene copolymers, butadiene-isoprene copolymers, isobutylene copolymers with isoprene, dicyclopentadiene, styrene, divinylbenzene, etc., terpolymers of ethylene and propylene with dicyclopentadiene, 5-ethylidene-2-norbornene, etc., polychloroprene, polysiloxanes such as polydimethylsiloxane and derivatives in which some of the methyl groups are replaced by vinyl, phenyl and other alkyl and fluoroalkyl groups, fluoroelastomers, such as polymers and copolymers of vinylidene fluoride, trifluorochloroethylene, tetrafluoroethylene, etc., preferably those having hydrogen therein, nitroso rubbers, such as copolymers of trifluoronitrosomethane and tetrafluoroethylene, etc.

Particularly useful in the practice of this invention are mixtures of low vinyl and high vinyl polybutadienes, namely polybutadienes having no more than 12 percent of 1,2-structure therein and polybutadienes having no less than 60 percent of 1,2-structure, and also of mixtures of polyisoprene with polybutadienes, either of the low vinyl or high vinyl or of the intermediate types.

For the irradiation purposes of this invention, it is helpful, although not essential, to have unsaturated groups in the polymer components such as acetylenic or ethylenic groups, i.e., vinyl, cyclopentadiene, ethylidene-norbornene, etc. It may also be helpful to have groups therein which generate free radicals upon radiation, such as halogen, mercapto, etc. For example, RCl compounds may be irradiated to give chlorine and a free radical R·; and RSH radiated to give H and a free radical RS·. These free radicals will promote grafting, crosslinking, ethylenic polymerization, etc.

The miscible blends of these and other polymers are generally viscous liquids, prepared by stirring and heating the polymer mixtures. If too viscous, a solvent may be added and later driven off. During the radiation, the blends are maintained at a temperature which will keep the polymer mixture miscible.

The crosslinking effected by radiation may be promoted by certain agents added to the miscible blend such as alkyl halides (RX) and alkane and aromatic polyhalides, preferably chlorides, iodides and bromides, nitrous oxide ($N_2O$), sulfur monochloride (SCl), $NH_3$, polymaleimides, such as phenylenediamaleimide, hexamethylenedi-maleimide, ethylene dimaleimide, dimethylformamide, $SnCl_2$, $SnCl_4$, polythiols or polymercaptans, polyacrylic or polyallylic compounds, such as tetramethylene diacrylate and ethylene dimethacrylate, etc., tetravinylsilane, chlorobenzene, allylacrylate, neopentyl chloride, triallyl phosphate, triallyl cyanurate, etc.

It is desirable also to have the compositions free of impurities or compounding ingredients which will retard crosslinking or act as anti-rad agents, such as antioxidants, oils, oxygen, trimethylthiuram sulfide, sulfur, diphenyl guanidine, mercaptobenzothiazole, polyorthoaminophenol, phenyl-beta-naphthylamine, n-butyl mercaptan, t-dodecyl mercaptan, diethyl disulfide, p-quinone, 1,4-naphthoquinone, phenylhydroquinone, 2-naphthol, etc.

For exposure to irradiation, the various polymer compositions described herein can also be in film or fiber form or coatings and other shaped articles. When the composition is in liquid form, it can be exposed in any type of container that will not interfere with the electron stream, for example, thin aluminum tubes are satisfactory.

In the following examples, the radiation doses are reported in megarads which represent 1,000,000 rads. A "rad" is defined as the amount of radiation causing the absorption of 100 ergs of energy per gram of material. For the purposes of this invention, it is generally desirable to use a dose of at least 0.10 megarad, preferably at least 1 megarad. While larger doses of irradiation may be used, there is no practical purpose served in exceeding doses of 100 megarads.

SPECIFIC EMBODIMENT

The practice of this invention is illustrated by the following examples. These examples are given merely by way of illustration and are not intended to limit the scope of the invention in any way nor the manner in which the invention can be practiced. Unless specifically indicated otherwise, parts and percentages are given by weight.

EXAMPLE I

A miscible mixture of two polybutadienes (PBD) is prepared by heating and stirring a mixture of equal proportions of the two PBD. One is a low vinyl PBD (having about 10% vinyl groups therein and a weight average molecular weight of 80,000) for which the radiation gel dose ($R_g$) is 5.5 Mrads. The other is a high vinyl PBD (having about 60% vinyl groups therein and a weight average molecular weight of 13,000) for which the radiation gel dose ($R_g$) is 11.2 Mrads. A sheet of this blend having a thickness of 3 mm is passed under an electron beam so that the sheet is uniformly exposed to 7.2 Mrad. This exposure is above the 5.5 Mrad gel dose for the low vinyl PBD. The gelled portion of the treated blend represents 27% of the product. The gelled portion is found to contain 40% high vinyl as determined by Infrared analysis. This indicates that there has been a high percentage of crosslinkages of the A-B type between the low vinyl PBD and the high vinyl PBD.

EXAMPLE II

The procedure of Example I is repeated using equal proportions of a low vinyl PBD (10% vinyl and molecular weight of 33,000) and a polyisoprene (PI) having a weight average molecular weight of 11,200. The gel dose for the PBD is 11 Mrads and for the PI is 25 Mrads. The blend is given a radiation dose of 25 Mrads. The gelled portion represents 29% of the product. Infrared analysis of the gelled portion shows that 67% of the original PI is incorporated in the gel which indicates a high rate of formation of A-B linkages in the blend.

EXAMPLE III

A miscible mixture similar to that of Example I is added to a centrifuge made so as to be penetrable by radiation and equipped with an electron beam as shown in FIG. 2. A sufficient amount of the miscible mixture is used to fill the centrifuge under the electron beam area when the centrifuge is in operation. Radiation is supplied by an electron accelerator delivering electron radiation of 2 MeV energy. The centrifuging and radiation is operated for a period of 1 minute to give a radiation dose of about 9 Mrads. The resultant product is found to have about 55% of the high and low vinyl PBD crosslinked to each other.

When this procedure is repeated for a centrifuging period of 2 minutes to give a radiation dose of about 18 Mrads, the product is found to have about 95% of the high and low vinyl PBD crosslinked to each other.

EXAMPLE IV

A miscible mixture similar to that of Example I is fed into a system designed as shown in FIG. 3 in which the electron beam unit 2 is fed by an electron accelerator adapted to deliver electron radiation of 2 MeV energy. The degradation unit 6 comprises a mechanical shearing device which exerts a high shear rate degradation on the mixture being treated. After the radiation and shearing cycle has been operated for 3 minutes, a radiation dose of about 12 Mrads has been absorbed. The product is flushed from the system by opening valves 7 and 7'. This product is found to have about 60% of the low vinyl and high vinyl PBD crosslinked to each other.

When this procedure is repeated for a period of 6 minutes to give a radiation dose of about 24 Mrads, the product is found to have 93% of the high and low vinyl PBD crosslinked to each other.

EXAMPLE V

The procedure of Example IV is repeated except that the degradation element 6 is an ultrasonic device capable of producing degradation approximately equivalent to that of the shearing action of the device used in Example IV. The overall crosslinking results are similar to those of Example IV.

EXAMPLE VI

The procedures of Examples III, IV and V are repeated with substantially similar results using the mixture of Example II in place of the mixture of Example I.

EXAMPLE VII

The procedures of Examples III-V are repeated a number of times with satisfactory crosslinking results using independently the following mixtures at an appropriate temperature to keep the polymer components miscible:
a. 25% polyethylene - 75% polypropylene
b. 30% 1,4-polybutadiene - 70% polyisoprene
c. 60% 1,4-polybutadiene - 40% SBR (styrene-butadiene rubber)
d. 30% polyethylene - 70% 1,4-polybutadiene
e. 35% ethylene-propylene copolymer - 65% 1,4-polybutadiene
f. 50% polyvinylphosphazine - 50% polyvinylmethylsiloxane

EXAMPLE VIII

The procedure of Example III is repeated a number of times with very satisfactory crosslinking results using independently 5% by weight based on the polymer mixture of the following crosslinking aids:
a. o-dichlorobenzene
b. m-phenylenedimaleimide
c. tetravinylsilane
d. sulfur monochloride
e. ethylene dimercaptan While certain features of this invention have been described in detail with respect to various embodiments thereof, it will of course be apparent that other modifications can be made within the spirit and scope of this invention, and it is not intended to limit the invention to the exact details insofar as they are defined in the following claims.

The invention claimed is:

1. A process for producing substantial crosslinking between two or more polymer components comprising the steps of preparing a miscible mixture of said polymer components, said mixture being completely homogeneous and comprising at least 20 percent by weight each of at least two said polymer components based on the combined weight of said polymer components and thereafter irradiating said mixture while still maintained in a miscible condition with a high energy electron source generating at least about 10,000 electron volts until a dose of at least 0.1 megarad has been absorbed, said polymer components each having a group therein capable of generating free radicals upon irradiation, in which process initially prepared highly crosslinked product is either removed or partially degraded during radiation of less highly crosslinked portions of said mixture.

2. The process of claim 1 in which the said dose is at least 1 megarad.

3. The process of claim 1 in which said miscible mixture comprises a mixture of a polybutadiene having no more than 12 percent of vinyl or 1,2- structure therein and a polybutadiene having no less than 60 percent vinyl structure therein.

4. The process of claim 1 in which said miscible mixture comprises a mixture of a polybutadiene and of a polyisoprene.

5. The process of claim 1 in which said irradiation is effected while said mixture is exerted to centrifugal forces so that the more highly crosslinked portion of said mixture is removed from the radiation field during radiation of the less highly crosslinked portion of said mixture.

6. The process of claim 1 in which the initially radiated product is partially degraded.

7. The process of claim 6 in which said degradation is effected by mechanical shear.

8. The process of claim 7 in which said mechanical shear is effected in a milling or kneading machine.

9. The process of claim 8 in which said degradation is effected by ultrasonic vibration.

10. The process of claim 1 in which said crosslinking is effected in the presence of at least 0.5 percent by weight based on the combined weight of said polymer of a compound containing a functional group selected from the class consisting of ethylenically unsaturated groups, halides and mercaptols.

11. The process of claim 11 in which said compound is an o-dichlorobenzene.

12. The process of claim 11 in which said compound is a polymercaptan.

13. The process of claim 11 in which said compound is a phenylenedimaleimide.

14. The process of claim 11 in which said compound is tetravinylsilane.

15. The process of claim 1 in which said free radical generating group is selected from the class consisting of ethylenic, acetylenic, halogen and mercapto groups.

16. The process of claim 15 in which said free radical generating group is an ethylenic group.

* * * * *